US008843132B2

(12) United States Patent
Fadell

(10) Patent No.: US 8,843,132 B2
(45) Date of Patent: Sep. 23, 2014

(54) DYNAMIC CARRIER SELECTION

(75) Inventor: Tony Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/022,569

(22) Filed: Feb. 7, 2011

(65) Prior Publication Data
US 2011/0130140 A1 Jun. 2, 2011

Related U.S. Application Data

(63) Continuation of application No. 11/548,162, filed on Oct. 10, 2006, now Pat. No. 7,885,654.

(51) Int. Cl.
*H04W 40/00* (2009.01)
*H04W 8/06* (2009.01)
*H04W 48/18* (2009.01)

(52) U.S. Cl.
CPC .............. *H04W 8/065* (2013.01); *H04W 48/18* (2013.01)
USPC ..................................... 455/435.2; 370/395.2

(58) Field of Classification Search
CPC ................................ H04W 48/18; H04W 8/06
USPC ........................ 455/332, 435.2; 370/329–337
See application file for complete search history.

(56) References Cited

U.S. PATENT DOCUMENTS

| | | | |
|---|---|---|---|
| 5,915,214 A | 6/1999 | Reece et al. | |
| 2002/0087674 A1 | 7/2002 | Guilford et al. | |
| 2003/0050070 A1 | 3/2003 | Mashinsky et al. | |
| 2004/0017798 A1 | 1/2004 | Hurtta et al. | |
| 2004/0038676 A1* | 2/2004 | Hochscherff et al. | 455/422.1 |
| 2004/0148343 A1 | 7/2004 | Mottes | |
| 2004/0162058 A1 | 8/2004 | Mottes | |
| 2004/0198356 A1* | 10/2004 | Dunlop et al. | 455/435.2 |
| 2004/0267931 A1 | 12/2004 | Mullany et al. | |
| 2005/0074014 A1 | 4/2005 | Rao et al. | |
| 2005/0079863 A1 | 4/2005 | Macaluso | |

(Continued)

FOREIGN PATENT DOCUMENTS

| | | |
|---|---|---|
| WO | 00/41486 | 7/2000 |
| WO | 02/104062 A1 | 12/2002 |
| WO | WO 2004/047476 A | 6/2004 |

OTHER PUBLICATIONS

European Application No. 07 843 927.0-2412, EPO Office Action dated Feb. 23, 2011, 7 pages.

(Continued)

*Primary Examiner* — Marcos Batista
(74) *Attorney, Agent, or Firm* — Womble Carlyle Sandridge & Rice LLP

(57) ABSTRACT

Systems, methods, computer software for providing access to wireless communication services are provided. The invention, in one embodiment, can involve storing a network address on a mobile device and sending a request for network operator data from the mobile device to a mobile virtual network operator server associated with the network address. In response, network operator data is received, and, based on the received network operator data, a network operator is selected. Communications are thereafter conducted using the selected network operator. In some situations, bids are received from multiple network operators for rates at which communication services using each network operator can be obtained. Preferences among the network operators are identified using the received bids, and the preferences are used to select the network operator for the mobile device to use in conducting communications.

25 Claims, 4 Drawing Sheets

(56) References Cited

U.S. PATENT DOCUMENTS

| | | | |
|---|---|---|---|
| 2005/0124338 A1* | 6/2005 | Benco et al. | 455/432.1 |
| 2005/0213566 A1 | 9/2005 | Jutila et al. | |
| 2006/0166669 A1* | 7/2006 | Claussen | 455/435.3 |
| 2006/0179310 A1* | 8/2006 | Zhang | 713/168 |

OTHER PUBLICATIONS

Office Action issued in Chinese application No. 200780045516.6 dated Jul. 13, 2011, 12 pages.

Stephan Ouaknine, North America—Issue 2006, Connect-World, THe MVNO Era of Mobile Innovation, pp. 1-5.

PCT International Search Report, PCT/US2007/080599, Apr. 11, 2008, pp. 1-4.

PCT Written Opinion of the International Searching Authority, PCT/US2007/080599, Apr. 11, 2008, pp. 1-8.

PCT International Preliminary Report on Patentability, PCT/US2007/080599, Apr. 23, 2009, pp. 1-10.

* cited by examiner

205 - Store a network address

210 - Send a request for network operator data

215 – Receive network operator data in response to the request

220 – Select an operator network

225 – Conduct communications using the selected network operator.

230 – Receive updated information (return to 220)

FIG. 2

305 – Solicit bids from network operators for use in providing communication services 310 – Receive bids from the network operators 315 – Select one or more operator networks to be used by a mobile device 320 – Receive additional bids 325 – Dynamically update network operator preference information 330 – Determine whether to select a different operator network

FIG. 3

DYNAMIC CARRIER SELECTION

CLAIM OF PRIORITY

This application is a continuation of U.S. application Ser. No. 11/548,162 filed Oct. 10, 2006, now U.S. Pat. No. 7,885,654 issued Feb. 8, 2011, which is incorporated herein by reference.

TECHNICAL FIELD

The invention relates to the field of telecommunications, and more particularly to dynamically selecting mobile carriers.

BACKGROUND

A typical mobile phone or other cellular communication device is preprogrammed with a carrier or network operator that serves as the home network for the device. Normally, the device communicates over the home network when it is in an area served by the home network. When the device is outside of the home network area (or is roaming), the device typically uses a preferred roaming list to determine which network operator or carrier to use. In other words, the phone is programmed with a preferred roaming list, which is a list of identifiers for carriers that can be used, in order of preference, when the home carrier cannot be used.

In some cases, a service subscriber is served by a mobile virtual network operator (MVNO). An MVNO is a mobile operator that does not own communications spectrum and typically does not possess any network infrastructure. Instead, MVNO's contract with traditional mobile operators to buy service (e.g., usage minutes) for their own customers. An MVNO is typically tied to a specific carrier (e.g., Sprint or Verizon, which does own spectrum and has its own network infrastructure). Accordingly, primary service to an MVNO customer is provided through that specific carrier (i.e., the carrier is the "home" carrier).

SUMMARY

This invention relates generally to the dynamic updating of carrier preference data for a mobile device. For example, carrier preference data can be updated in accordance with or to reflect bids from actual carriers as to the cost of network access (i.e., usage minutes).

According to one embodiment of the invention, access to a wireless cellular communication network can be provided by storing a network address on a mobile device. The network address can identify a mobile virtual network operator server storing mobile network operator data for use by the mobile device. A request for network operator data can be sent from the mobile device to the mobile virtual network operator server, and, in response to the request, network operator data can be received. A network operator for the mobile device can be selected based on the received network operator data, and communications can be conducted using the selected network operator.

Specific implementations of the invention can include one or more of the following features. The mobile device may not be associated with a particular home network operator. Bids can be received from multiple network operators for rates at which communication services using each network operator can be obtained. Preferences among the network operators can be determined using the received bids, and the preferences are used to select the network operator. Preferences may be further based on a location of the mobile device, the quality of service offered by the network operator, and/or type of communication. Bids from multiple network operators for rate information relating to rates at which communication services using each network operator can be obtained and the rate information can be sent to the mobile device for use in selecting the network operator. The rate information can be displayed on a user interface of the mobile device and a user selection of the network operator can be received from a user. The mobile device can be registered with a network operator for a limited purpose of sending the request and receiving the network operator data in response to the request, and the mobile device can be separately registered with the selected network operator for conducting communications after receiving the network operator data. Negotiations can be conducted with one or more network operators to provide access for the purpose of sending the request and the network operator data can be received in response to the request. The network operator data can be dynamically updated in the mobile virtual network operator server based on parameters associated with multiple network operators. The mobile device is preprogrammed with a carrier identifier associated with the mobile virtual network operator server.

According to another specific implementation, a message can be received from a mobile device identifying a current location of the mobile device. Network operator preference data can be sent to the mobile device, and the network operator preference data can identify a first set of preferences among multiple network operators for use by the mobile device in selecting one or more network operators. The network operator preference data can be updated to identify a second set of preferences among the multiple network operators, and the updated network operator preference data can be sent to the mobile device.

In addition, updating the network operator preference data can be performed dynamically based on parameters associated with the multiple network operators. The parameters include bids relating to rates at which communication services are available from each network operator, data relating to the network operators in an area corresponding to the current location of the mobile device, and/or rate information for different communication services available from each network operator. Bid information for each of multiple network operators can be received, and the bid information can relate to one or more rates at which communication services are available from each network operator. The network operator preference data can be updated using the bid information. The updated network operator preference data enables a user of the mobile device to select among multiple network operators. The updated network operator preference data can enable the mobile device to automatically select among multiple network operators.

A mobile virtual network operator server can operate to receive location data from mobile devices and, in response to the received location data, send network operator preference data to each mobile device. The network operator preference data can include data indicating preferences among multiple network operators and/or data for use in determining preferences among multiple network operators. An interface with each of multiple network operators can enable the mobile virtual network operator server to receive location data from each of the mobile devices and send network operator preference data to each of the mobile devices.

In addition, the mobile virtual network operator server can be a home location register. The mobile virtual network operator server may be operable to generate the network operator preference data based on parameters relating to the multiple network operators. The parameters can include pricing information for each of the network operators. The mobile virtual network operator server can operate to dynamically update the network operator preference data using the pricing information.

The details of one or more implementations are set forth in the accompanying drawings and the description below. Other features will be apparent from the description and drawings, and from the claims.

DESCRIPTION OF DRAWINGS

FIG. 2 is a flow diagram of a process 200 for providing access to a wireless communication services in accordance with an embodiment of the present invention.

FIG. 3 is a flow diagram of a process 300 for receiving rate bids from network operators to dynamically update network operator preference data in accordance with an embodiment of the present invention.

DETAILED DESCRIPTION

Figure 1:
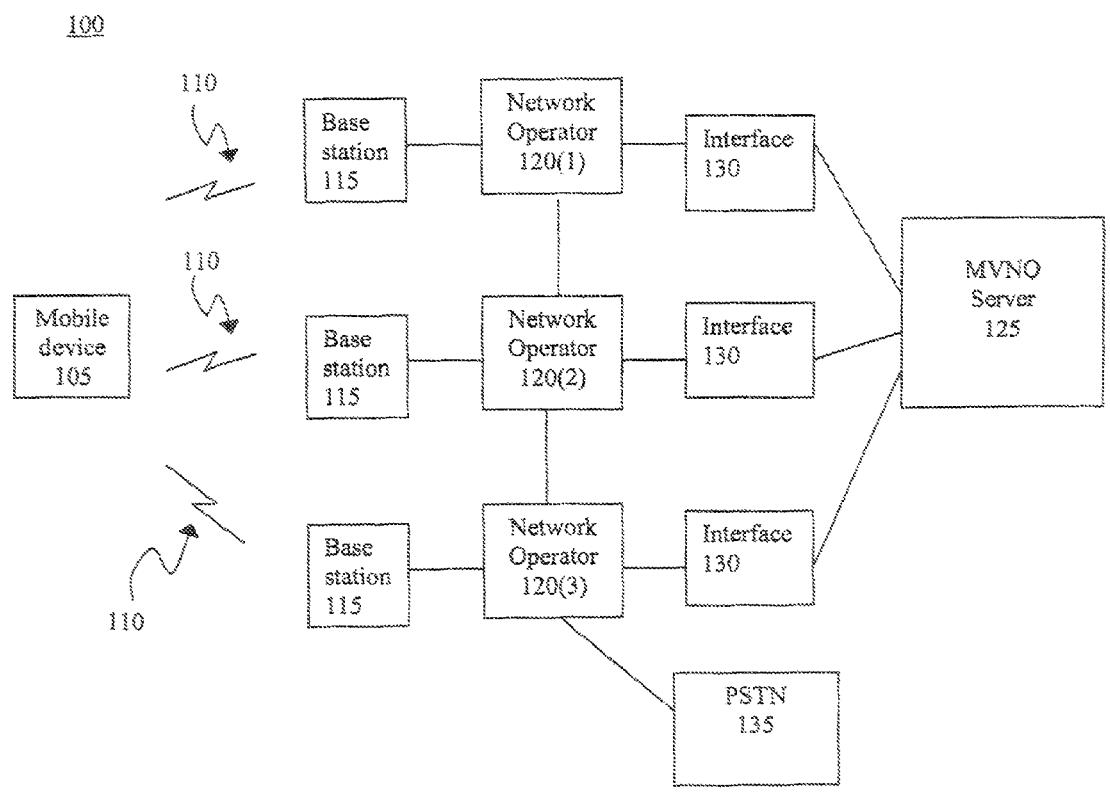
FIG. 1 is a block diagram of a system for providing access to mobile or cellular communications services in accordance with an embodiment of the present invention.

FIG. 1 is a block diagram of system 100 for providing access to mobile or cellular communications services. Mobile device 105 may be capable of establishing voice and/or data communications across wireless interface 110 with base station 115 in one or more operator networks 120(1), 120(2), and 120(3). For example, operator networks 120(1), 120(2), and 120(3) can be run by different operators and may use different parts of the available spectrum. In one scenario, mobile device 105 can communicate with a home network or, when in an area not served by the home network, with a visited network (i.e., in a roaming mode).

In one embodiment, mobile device 105 may not have an available home network. Instead, mobile device 105 can roam and use a carrier ID for a mobile virtual network operator (MVNO) associated with MVNO server 125. The carrier ID can typically preprogrammed into mobile device 105 and identifies the carrier (the MVNO, in this case) for mobile device 105 both to mobile device 105 and to operator networks 120(1), 120(2), and 120(3). To obtain wireless connectivity, mobile device 105 first may be authorized to communicate through at least one of operator networks 120(1), 120(2), or 120(3). Mobile device 105 can communicate with MVNO server 125 to receive authorization. For example, when mobile device 105 is powered up or enters a new area with wireless coverage, mobile device 105 registers with at least one of operator networks 120(1), 120(2), or 120(3). In some implementations, mobile device 105 may register with operator network 120(1), 120(2), or 120(3) for the limited purpose of communicating with the MVNO server 125 to obtain necessary authorizations and/or to receive data from MVNO server 125. The MVNO may negotiate and contract with operator network 120(1), 120(2), or 120(3) to provide such limited purpose communications, such that when operator network 120(1), 120(2), or 120(3) receives the initial registration signal, it can selectively allow communications between mobile device 105 and MVNO server 125 based upon recognition of the carrier ID included in the initial registration signal.

Mobile device 105 can send a message to MVNO server 125 through interface 130 between operator network 120(1), 120(2), or 120(3) and MVNO server 125. This message can serve to identify mobile device 105 as well as a current location (e.g., cellular service area) of the mobile device. In response, MVNO server 125 can provide operator network preference information to mobile device 105. In some cases, the information may be an update to information previously received by mobile device 105 or an indication that there is nothing to update. The operator preference information can be a preferred roaming list that indicates an order of preference for operator networks 120(1), 120(2), or 120(3) to be used by mobile device 105. The operator preference information may be based on the current location, current usage rate data, type of communication (e.g., data, voice, packet-switched, or circuit-switched), quality of service information, and/or user preference information stored in MVNO server 125. In some implementations, the operator preference information may provide data that enables the device itself or a user of the device to select the particular operator network 120(1), 120(2), or 120(3) instead of simply listing an order of preference for operator networks 120(1), 120(2), and 120(3). For example, MVNO server 125 may send rate information (e.g., cost per minute, cost per unit of data, etc.) and quality of service data that enables software on mobile device 105: (a) to determine which operator network 120(1), 120(2), or 120(3) to use in accordance with criteria stored locally on mobile device 105 or (b) to display a selection on a user interface to allow a user to make a manual selection.

After receiving the operator network preference information, mobile device 105 can establish communication sessions based on the operator network preference information. Subsequent communications need not be conducted through the particular operator network 120(1), 120(2), or 120(3) with which the mobile device initially registered. As a result, mobile device 105 may register with another operator network 120(1), 120(2), or 120(3) for purposes of conducting voice or data communications. The subsequent registration may result in an exchange of data between MVNO server 125 and selected operator network 120(1), 120(2), or 120(3) through corresponding interface 130. For example, such a data exchange may enable operator network 120(1), 120(2), or 120(3) to receive authentication information for mobile device 105 from MVNO server 125 and send billing or usage information to MVNO server 125. In addition, MVNO server 125 may serve as a home location register (HLR) for mobile device 105. Accordingly, MVNO server 125 may store and/or track additional information relating to mobile device 105 (e.g., user preferences, information about services that mobile device 105 subscribes to, and the like). Such information may be retrieved, as necessary, by operator network 120(1), 120(2), or 120(3) for use in providing communication services to mobile device 105.

The subsequent communications may be distinguished from the initial communications with MVNO server 125 using the initial registration because the initial communications involve transmission and exchange of network overhead data, while the subsequent communications may involve both network overhead data (e.g., registration signals, call setup information, handoff messages, location updates, and the like) and user data and signals (e.g., voice communications, user-initiated data requests and transfers, and responses to user data requests). The initial communications may select operator network 120(1), 120(2), or 120(3) at random or based on previously stored operator network preference information, while the subsequent communications select operator network 120(1), 120(2), or 120(3) based on the most up-to-the-minute operator network preference information.

As an example of a typical scenario, mobile device 105 may send an initial registration signal across wireless interface 110 to base station 115 associated with first operator network 120(1) for sending a location update message to MVNO server 125. In response to the location update message, MVNO server 125 may provide updated operator network preference information to mobile device 105. Based on this preference information, mobile device 105 may select a different operator network 120(3) for handling communications. Accordingly, mobile device 105 may send another registration signal to selected operator network 120(3) to obtain broader or further communication services. Once mobile device 105 is registered with selected operator network 120(3), mobile device 105 can conduct communications over wireless interface 110 with base stations 115 associated with selected operator network 120(3). These communications may include voice, data, or other communications with other subscribers, devices, or servers in selected operator network 120(3), other operator networks 120(1) and 120(2), public switched telephone network (PSTN) 135, or other external networks (not explicitly shown).

After registering with selected operator network 120(3), the mobile device can operate in a roaming mode. In the roaming mode, the location of mobile device 105 may be periodically updated in MVNO server 125 in case mobile device 105 travels between different service areas in operator network 120(3). Thus, MVNO server 125 can periodically or on an as-needed basis send messages to mobile device 105. In addition to location, other circumstances (e.g., available rates) may change. These changes may impact the operator network preference information. For example, the ordering of operator networks 120(1), 120(2), and 120(3) in the preference list may change or there may otherwise be a change in the data that was sent to mobile device 105 for use in selecting operator network 120(1), 120(2), or 120(3). In such a case, MVNO server 125 can dynamically update the operator network preference information by sending an update message to mobile device 105 through currently selected operator network 120(3).

Software residing on MVNO server 125 may include instructions for updating the network operator preference information based on information relating to various available operator networks 120(1), 120(2), and 120(3). For example, the software may simply update the network operator preference information and forward the updated information to mobile device 105 as such updated information is received. Alternatively, the software may use received information to calculate new usage rate information or to identify a operator network preferences based on other parameters, such as the location of mobile device 105 or the quality of service available from different operator networks 120(1), 120(2), and 120(3) at the current location. In some implementations, the network operator preference information may be dynamically updated based on bids relating to rates at which communication services are available from each operator network 120(1), 120(2), and 120(3). For example, network operators 120(1), 120(2), and 120(3) may continuously or periodically bid on usage rates that they each make available to mobile devices 105 associated with MVNO server 125. In addition, available rates may change as a result of a particular network operator offering only a limited number of minutes of usage at a particular rate or offering a particular rate for only a limited time. When this number of minutes have been used or the limited time has expired, MVNO server 125 may need to update the network operator preference information provided to mobile device 105.

In some cases, the updated operator network preference information may result in a selection of another available operator network 120(2) for use by mobile device 105. As a result, mobile device 105 may register with the new operator network 120(2) and cease communications with the previously selected operator network. In some implementations, the updated information may be received during an ongoing communication session (e.g., a voice call), in which case a handoff of mobile device 105 may be initiated by mobile device 105 or one of operator networks 120(2) or 120(3), assuming such an inter-network handoff is supported by operator networks 120(2) and 120(3). Thus, the operator network preferences may be dynamically updated (e.g., substantially in real time) as circumstances within overall system 100 change or evolve.

FIG. 2 is a flow diagram of process 200 for providing access to a wireless communication services. Process 200 involves storing (205) a network address for MVNO server 125 on mobile device 105. The network address may be in the form of an IP address, an address in an SS7 network, or simply a carrier ID. The network address can allow operator network 120(1), 120(2), or 120(3) to identify and contact MVNO server 125 associated with mobile device 105 and that maintains subscription, authentication, and preference data for mobile device 105. Using the network address, mobile device 105 can send (210) a request for network operator data and/or other information to MVNO server 125. In some cases, the request can be a specific request for updated operator network preference data for use in selecting among multiple available operator networks. In other cases, the request need not be a specific request but can be a location update or other type of message that serves as an implicit request for any information updates or other data.

In response to the request, network operator data, such as preferences among operator networks or data identifying usage rates available from the operator networks is received (215). For example, the network operator data can be sent from MVNO server 125 to mobile device 105. Alternatively, the network operator data can be received by MVNO server 125 from the operator networks themselves or from other third party data providers. Using the received network operator data, operator network 120(1), 120(2), or 120(3) can be selected (220) for use by mobile device 105 in conducting communications. In some implementations, the selection can be made by MVNO server 125 and communicated to mobile device 105. In other implementations, the selection of a particular operator network can be made by the mobile device based on information provided by MVNO server 125. Thereafter, communications involving mobile device 105 can be conducted (225) using the selected network operator.

In some cases, updated information can be subsequently received (230). The updated information may relate to the location of mobile device 105 or a change in rates or other circumstances within the available operator networks. In some cases, the updated information can be received by MVNO server 125, while in other cases the updated information can be received by mobile device 105. Based on the updated information, a selection of an operator network may be made (220). In some cases, the selection may be of the same operator network as previously selected. In other cases, the selection may be of a different operator network. In the latter case, communications involving mobile device 105 can be subsequently conducted (225) using the newly selected network operator.

FIG. 3 is a flow diagram of process 300 for receiving rate bids from network operators to dynamically update network operator preference data. An MVNO or other entity can solicit (305) bids from a plurality of network operators for use in providing communication services to subscribers of the MVNO. In response, bids can be received (310) from the network operators. The bids can indicate rate information and potentially other restrictions or conditions for communication services provided through the respective operator networks. For example, a bid may indicate that a first network operator is willing to provide wireless voice communication services for a first specified per-minute rate. Another bid may indicate that a second network is willing to provide wireless voice communication services for a second specified per-minute rate and data communication services for a particular rate per megabyte of data transferred. Based on the bids and potentially on other information regarding the operator networks, one or more operator networks to be used by a mobile device served by the MVNO can be selected (315).

As additional bids are received over time (320), network operator preference information can be dynamically updated (325), and a determination can be made (330) as to whether to select a different operator network. The selection of operator networks can be made by either the mobile device itself using information provided by the MVNO server or by the MVNO server, where the selection is communicated to the mobile device. In some implementations, the selection of the operator network can be made by the user in response to viewing a display on the mobile device of the rate information and/or other data relating to the operator networks. In addition to the rate information, the selection may also be based on a current location of the mobile device, the quality of service offered by the various network operators, and/or the type of communication.

Figure 4:
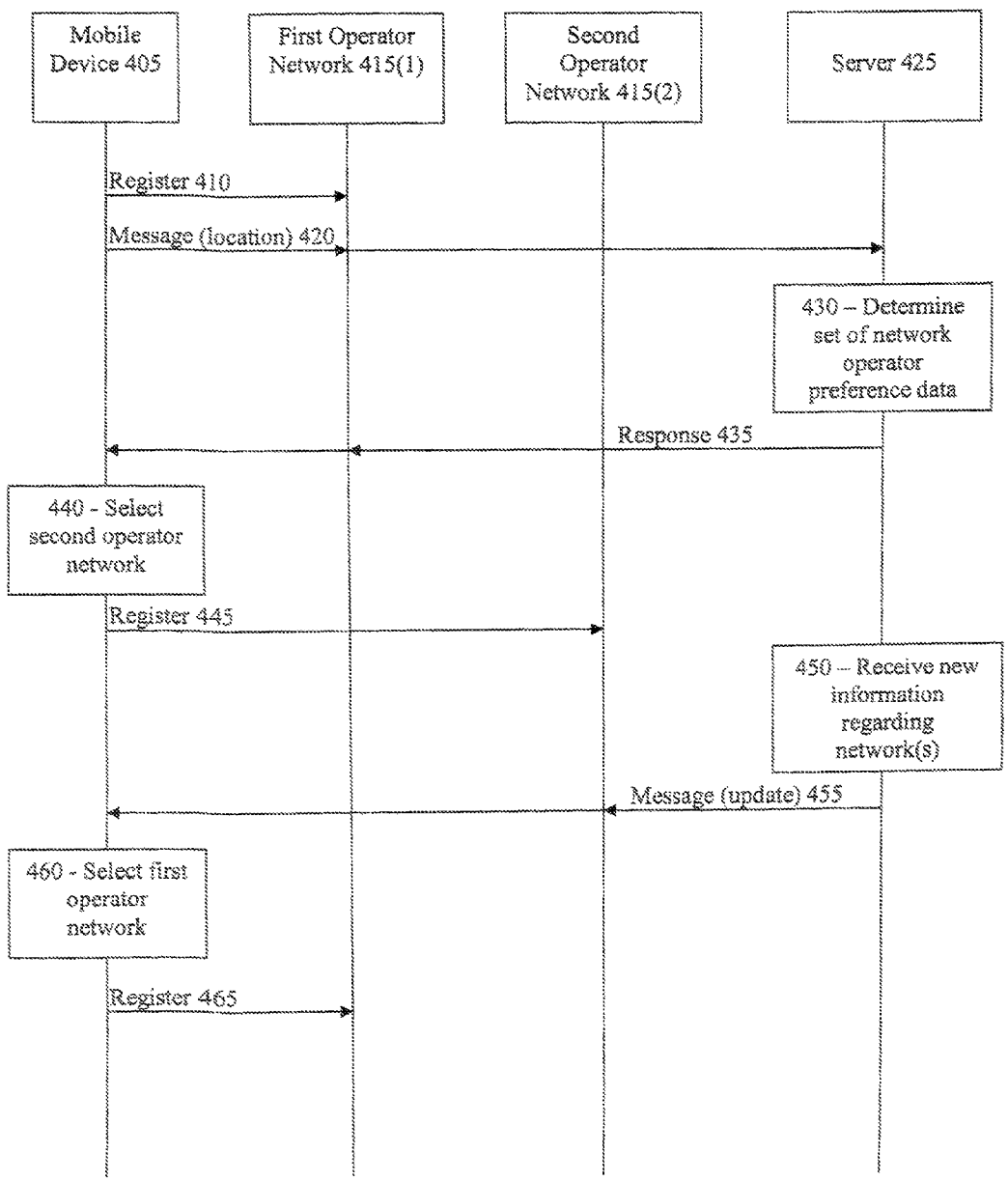
FIG. 4 is a signaling and flow diagram of a process 400 for dynamically updating network operator selection information in accordance with an embodiment of the present invention.

FIG. 4 is a signaling and flow diagram of process 400 for dynamically updating network operator selection information. Mobile device 405 can register (410) with first operator network 415(1). After registering, message 420 identifying a current location of mobile device 405 can be sent from mobile device 405, through first operator network 415(1) to server 425 associated with mobile device 405. Server 425 can determine (430) a set of network operator preference data for the current location of mobile device 405 and sends response 435 to mobile device 405, again through first operator network 415(1). Based on processing or reading of the information in the received response, mobile device 405 can select (440) second operator network 415(2) for conducting additional communications. Accordingly, mobile device 405 can register (445) with second operator network 415(2).

Subsequently, server 425 can receive (450) new information reflecting new circumstances in the overall environment. For example, the new information may relate to rates offered by one or more network operators, a location of the mobile device, or any other data that may have an impact on the selection of a network operator. Using the new information, the server can send message 455 to mobile device 405 to dynamically update the set of network operator preference data. Based on processing or reading of the information in message 455, mobile device 405 can select (460), in this example, first operator network 415(1) for conducting further communications. Accordingly, mobile device 405 can again register (465) with first operator network 415(1). As will be understood to persons of ordinary skill, process 400 may continue indefinitely, with the network operator preference data being repeatedly dynamically updated to result in selections among any number of available operator networks.

The described invention can be implemented in the context of a mobile device that is not associated with a particular home network (i.e., a device that continuously operates in roaming mode), or in the context of a mobile device that is associated with a home network. In the latter case, the techniques described herein can be used by the mobile device while roaming.

Using the techniques described herein, a mobile device is not limited to a particular operator network, but can constantly roam among different operator networks depending upon a current set of network operator preferences. Furthermore, the techniques allow an MVNO to provide the cheapest available rates, to provide the cheapest rates with an acceptable quality of service, and/or to allow users to tailor their selection of operator networks according to their own parameters. Moreover, the techniques allow network operators to establish better network utilization. For example, if a network operator has excess capacity, the network operator can offer low rates to an MVNO for a limited period of time to fill some of the excess capacity and provide an additional revenue stream. Similarly, if there are times of day when or locations where network utilization is low, the network operator can attempt to improve utilization by offering low rates to an MVNO. At the same time, the network operator has greater control over rates by being able to bid for providing service. As a result, the described techniques can be used to establish increased liquidity of network resources.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, the described techniques may be implemented in systems with a different architecture than that shown and described. Furthermore, some operations performed in the described processes can be reordered, omitted, or supplemented with additional operations. Accordingly, other implementations are within the scope of the following claims.

What is claimed is:

1. A method for providing access to a wireless cellular communication network, the method comprising:
   at a mobile device:
   identifying a network address for a server configured to:
   (i) communicate with a plurality of network operators,
   (ii) operate as a home location register (HLR) for the mobile device,
   (iii) receive usage rate bids associated with communication services from each network operator of the plurality of network operators, and
   (iv) store network operator preference data based on the usage rate bids;
   transmitting, to the server, location information that identifies a current location of the mobile device;
   receiving, from the server, at least a portion of the network operator preference data, wherein the at least a portion of the network operator preference data is selected by the server based on the location information;
   selecting, based on the at least a portion of the network operator preference data, a network operator to use for communications; and
   transmitting a request for services to the selected network operator.

2. The method of claim 1, wherein prior to transmitting the request for services to the selected network operator, the mobile device is not associated with the selected network operator.

3. The method of claim 1, further comprising displaying usage rate information associated with at least one of the plurality of network operators on a user interface of the mobile device.

4. The method of claim 1, wherein the network operator preference data is dynamically updated based on subsequently received usage rate bids from one or more of the plurality of network operators.

5. The method of claim 4, further comprising receiving, from the server, at least a portion of the dynamically updated network operator preference data.

6. The method of claim 1, wherein the mobile device is preprogrammed with a carrier identifier that identifies the network address of the server.

7. A machine-readable, non-transitory medium configured to store instructions that, when executed by a processor included in a server, cause the server to:
   for each operator network of a plurality of operator networks:
      receive at least one parameter from the operator network, wherein the at least one parameter is associated with the operator network;
   store, at the server, preference data based on the parameters;
   receive, from a mobile device via one operator network of the plurality of operator networks, authentication information that identifies the server, wherein the one operator network uses the authentication information to authorize communications between the mobile device and the server, and the communications occur via the one operator network;
   receive, from the mobile device via the one operator network, location information that identifies a current location of the mobile device, wherein the server is configured to operate as a home location register (HLR) for the mobile device;
   select at least a portion of the preference data based on the location information; and
   transmit, to the mobile device via the one operator network, the at least a portion of the preference data, wherein the mobile device is configured to:
      select an operator network from the plurality of operator networks based on the at least a portion of the preference data, and
      establish a connection to the selected operator network.

8. The machine-readable, non-transitory medium of claim 7, wherein each parameter comprises a bid relating to a usage rate for a communication service provided by the associated operator network.

9. The machine-readable, non-transitory medium of claim 7, wherein the at least a portion of the preference data is associated with one or more network operators in an area that corresponds to the current location of the mobile device.

10. The machine-readable, non-transitory medium of claim 7, wherein the authentication information comprises a network address of the server.

11. The machine-readable, non-transitory medium of claim 7, wherein prior to receiving the authentication information, the mobile device is not associated with the one operator network.

12. The machine-readable, non-transitory medium of claim 7, wherein the instructions, when executed by the processor, further cause the server to:
prior to transmitting the at least a portion of the preference data, authorize the mobile device to receive the at least a portion of the preference data in response to receiving the authentication information.

13. The machine-readable, non-transitory medium of claim 7, wherein the instructions, when executed by the processor, further cause the server to:
store subscription information relating to services the mobile device subscribes to, wherein the selection of the at least a the portion of the preference data is based on the subscription information.

14. A method for providing access to a wireless cellular communication network, the method comprising:
at a mobile device:
storing a carrier identifier that identifies a server;
sending, to one operator network of a plurality of operator networks, a registration message comprising the carrier identifier, wherein the registration message authorizes the mobile device to communicate with the server via the one operator network;
sending, to the server via the one operator network, location information that identifies a current location of the mobile device;
receiving, from the server via the one operator network, preference data selected by the server based on (i) the location information and (ii) a usage rate associated with at least one of the plurality of operator networks;
selecting an operator network, from the plurality of operator networks, based on the preference data; and
establishing a connection with the selected operator network.

15. The method of claim 14, wherein the registration message authorizes the mobile device to communicate with the server via the one operator network for a limited purpose of communicating the location information and the preference data.

16. The method of claim 14, wherein the selected operator network is the one operator network.

17. The method of claim 14, wherein the selected operator network is different from the one operator network.

18. The method of claim 14, wherein the server is configured to operate as a mobile virtual network operator (MVNO) server.

19. The method of claim 14, wherein the mobile device establishes the connection to the selected operator network by participating in a handover procedure between the selected operator network and another operator network.

20. The method of claim 14, further comprising:
prior to sending the registration message to the one operator network:
accessing previously received preference data stored at the mobile device, and
selecting the one operator network, from the plurality of operator networks, based on the previously received preference data.

21. A mobile device, comprising:
a wireless interface;
a processor; and
a storage device configured to store instructions that, when executed by the processor, cause the mobile device to:
store a carrier identifier that identifies a server,
send, to a first operator network, a registration message comprising the carrier identifier, wherein the registration message authorizes the mobile device to communicate with the server via the first operator network,
send, to the server via the first operator network, location information that identifies a current location of the mobile device,
receive, from the server via the first operator network, usage rate data associated with at least one of a plurality of operator networks that provide communication services at the current location of the mobile device,
select a second operator network, from the plurality of operator networks, based on the usage rate data, and
establish a connection to the second operator network.

22. The mobile device of claim 21, wherein the first operator network is different from the second operator network.

23. The mobile device of claim 21, wherein the carrier identifier comprises a network address of the server.

24. The mobile device of claim 21, wherein the instructions, when executed by the processor, further cause the mobile device to receive, from the server, updated usage rate data.

25. The mobile device of claim 24, wherein the instructions, when executed by the processor, further cause the mobile device to select a third operator network based on the updated usage rate data and establish a connection to the third operator network.

* * * * *